(12) United States Patent
Kitazawa (10) Patent No.: US 10,021,505 B2
(45) Date of Patent: Jul. 10, 2018

(54) CONTROL APPARATUS, MEASUREMENT SYSTEM, CONTROL METHOD, AND STORAGE MEDIUM

(71) Applicant: CANON KABUSHIKI KAISHA, Tokyo (JP)

(72) Inventor: Kyohei Kitazawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/196,882

(22) Filed: Jun. 29, 2016

(65) Prior Publication Data

US 2017/0013389 A1 Jan. 12, 2017

(30) Foreign Application Priority Data

Jul. 6, 2015 (JP) .................. 2015-135509

(51) Int. Cl.
| | | |
|---|---|---|
| H04R 1/10 | (2006.01) | |
| H04S 7/00 | (2006.01) | |
| G06F 3/16 | (2006.01) | |
| H04S 1/00 | (2006.01) | |
| H04R 3/00 | (2006.01) | |
| H04R 5/027 | (2006.01) | |

(52) U.S. Cl.
CPC ............ H04S 7/303 (2013.01); G06F 3/162 (2013.01); H04S 1/005 (2013.01); *H04R 3/00* (2013.01); *H04R 5/027* (2013.01); *H04S 2400/15* (2013.01); *H04S 2420/01* (2013.01)

(58) Field of Classification Search
CPC .......... G06F 3/165; G06F 3/167; G06F 3/162; H04S 7/303; H04S 2420/01; H04S 1/005; H04R 5/027; H04R 3/00

USPC ................ 381/17, 18, 56, 74, 303, 310
See application file for complete search history.

(56) References Cited

U.S. PATENT DOCUMENTS

| | | | | |
|---|---|---|---|---|
| 8,428,269 B1* | 4/2013 | Brungart | ............... | H04S 7/304 340/963 |
| 2010/0080396 A1* | 4/2010 | Aoyagi | ............... | H04S 1/005 381/17 |
| 2013/0154930 A1* | 6/2013 | Xiang | ............... | G06F 3/167 345/158 |

(Continued)

FOREIGN PATENT DOCUMENTS

| | | |
|---|---|---|
| JP | 2007-028134 A | 2/2007 |
| JP | 4924119 B2 | 4/2012 |

(Continued)

*Primary Examiner* — Paul S Kim
*Assistant Examiner* — Ubachukwu Odunukwe
(74) *Attorney, Agent, or Firm* — Carter, Deluca, Farrell & Schmidt, LLP (57) ABSTRACT

A control apparatus comprises a first obtaining unit configured to obtain a result of sound collection performed by a sound collection apparatus that collects a measurement signal as a sound, the measurement signal being output from an output apparatus; a detection unit configured to detect a position of the output apparatus or the sound collection apparatus relative to a measurement-subject person; and a second obtaining unit configured to obtain a head-related transfer function of the measurement-subject person based on the result of sound collection obtained by the first obtaining unit and the position detected by the detection unit.

17 Claims, 7 Drawing Sheets

(56) References Cited

U.S. PATENT DOCUMENTS

| | | | |
|---|---|---|---|
| 2013/0177166 A1* | 7/2013 | Agevik | H04S 1/005 |
| | | | 381/74 |
| 2014/0270199 A1* | 9/2014 | Takamatsu | H04R 29/004 |
| | | | 381/56 |
| 2015/0036848 A1* | 2/2015 | Donaldson | H04S 7/303 |
| | | | 381/303 |
| 2015/0180433 A1* | 6/2015 | Nakagawa | H03G 3/20 |
| | | | 381/98 |
| 2015/0205575 A1 | 7/2015 | Kitazawa | |
| 2015/0341735 A1 | 11/2015 | Kitazawa | |
| 2016/0323672 A1* | 11/2016 | Bhogal | H04R 5/04 |

FOREIGN PATENT DOCUMENTS

| | | |
|---|---|---|
| JP | 2014-099797 A | 5/2014 |
| JP | 2015-076797 A | 4/2015 |

\* cited by examiner

CONTROL APPARATUS, MEASUREMENT SYSTEM, CONTROL METHOD, AND STORAGE MEDIUM

BACKGROUND OF THE INVENTION

Field of the Invention

The present invention relates to a control apparatus, a measurement system, a control method, and a storage medium.

Description of the Related Art

It is known that using a listener's own head-related transfer function (HRTF) is a preferable way to increase the reproducibility of stereophony. Conventionally, it is difficult to apply the listener's own HRTF to stereophony because special equipment is needed in order to measure the listener's own HRTF. For this reason, an HRTF measured using a dummy head microphone that imitates an average head has been used in many cases.

Meanwhile, Japanese Patent Laid-Open No. 2014-99797 discloses technology to select a head-related transfer function that is suited to the listener from a HRTF database.

However, according to the technology disclosed in Japanese Patent Laid-Open No. 2014-99797, there is no guarantee that the database contains a head-related transfer function that is similar to the listener's own head-related transfer function, and even if the most suitable HRTF is used, the presence is low, compared to when the listener's own HRTF is used.

Head-related transfer function measurement using a conventional large speaker-traverse apparatus (moving apparatus) makes it possible to measure HRTFs at equal intervals. However, HRTFs used for stereophony need not always be measured at equal intervals, and technology that makes it possible to easily obtain the listener's own head-related transfer function is desired instead.

The present invention has been made in light of the above-described problems, and provides a technology that makes it possible to easily measure a head-related transfer function.

SUMMARY OF THE INVENTION

According to one aspect of the present invention, there is provided a control apparatus comprising: a first obtaining unit configured to obtain a result of sound collection performed by a sound collection apparatus that collects a measurement signal as a sound, the measurement signal being output from an output apparatus; a detection unit configured to detect a position of the output apparatus or the sound collection apparatus relative to a measurement-subject person; and a second obtaining unit configured to obtain a head-related transfer function of the measurement-subject person based on the result of sound collection obtained by the first obtaining unit and the position detected by the detection unit.

Further features of the present invention will become apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Embodiment 1

1. Configuration of Measurement System

Figure 1:
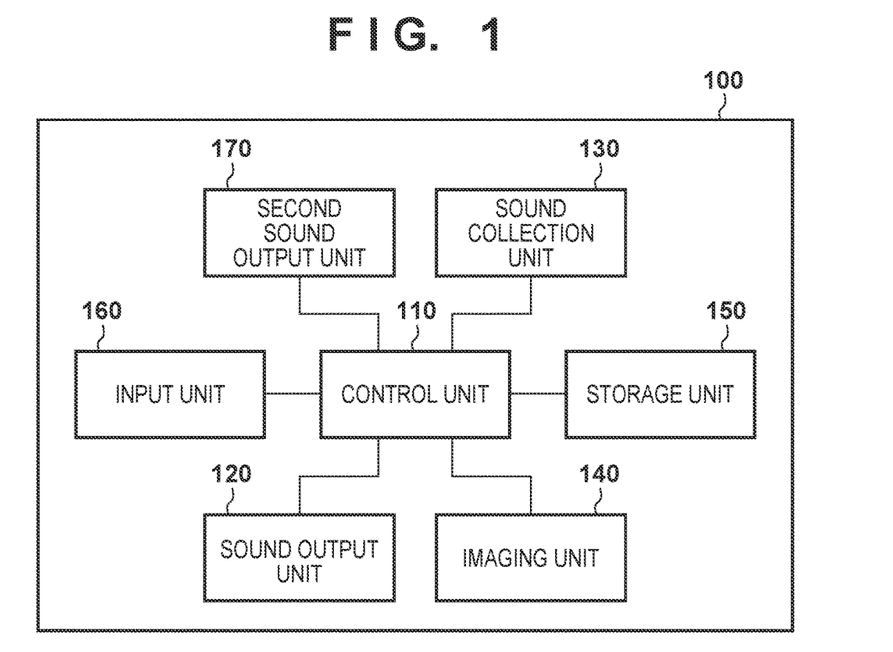
FIG. 1 is a block diagram showing an example of a configuration of a measurement system according to Embodiment 1 of the present invention.
Figure 2A:
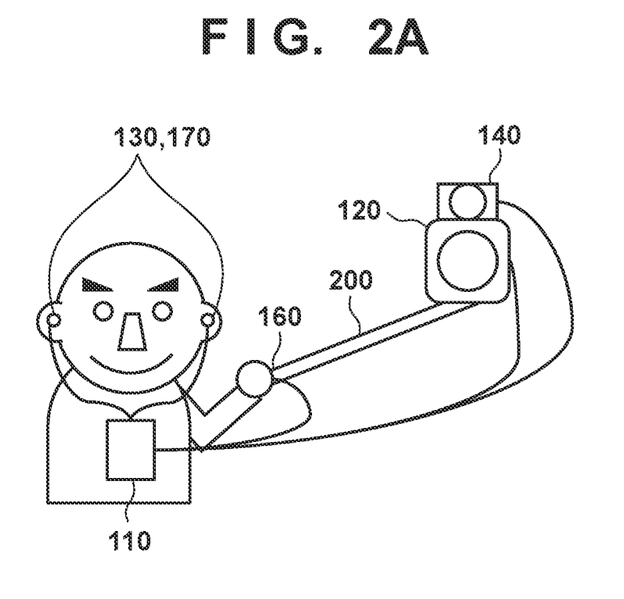
FIGS. 2A and 2B are diagrams showing usage examples of the measurement system according to Embodiment 1 of the present invention.
Figure 2B:
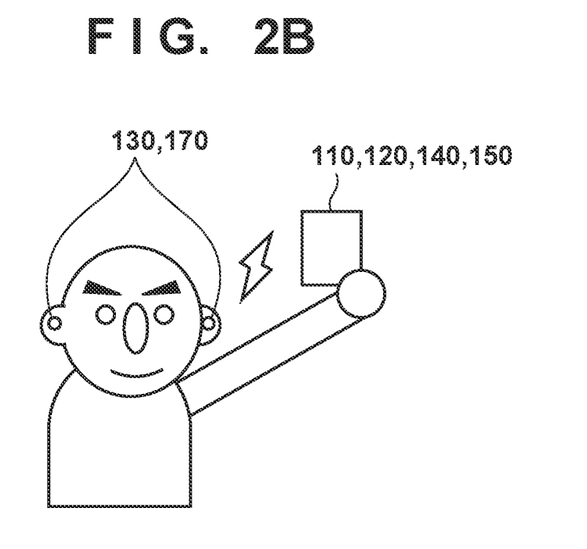

FIG. 1 is a block diagram showing an example of a configuration of a head-related transfer function (HRTF) measurement system 100 according to Embodiment 1 of the present invention. FIGS. 2A and 2B show usage examples of a head-related transfer function measurement system according to Embodiment 1. The head-related transfer function measurement system 100 includes a control unit 110 (a control apparatus), a sound output unit 120 (a sound output apparatus), a sound collection unit 130 (a sound collection apparatus), an imaging unit 140, a storage unit 150, an input unit 160, and a second sound output unit 170.

The control unit 110 is configured with a CPU and so on for example, and controls the entirety of the measurement system 100. The details of control are described below. The sound output unit 120 is a small speaker for example, and outputs an audio signal that is input from the control unit 110. For example, as shown in FIG. 2A, the sound output unit 120 is held by a measurement-subject person (hereinafter referred to as "user") via a supporting member 200 that is rod-shaped. Here, it is preferable that the supporting member 200 to be used is as thin as possible in light of the influence of reflection.

The sound collection unit 130 is constituted of, for example, two microphones that can be attached near the user's two earholes, and collects a sound generated from the measurement signal, which is output from the sound output unit 120. A sound collection result, which is the measurement signal collected as a sound, is output to the control unit 110. The imaging unit 140 is constituted of two cameras, for example. The two cameras of the imaging unit 140, for example, are fixed to the sound output unit 120 at a predetermined interval, and each capture an image of an object in the direction in which the sound output unit 120 outputs a sound. The captured images are output to the control unit 110.

The storage unit 150 is a storage apparatus such as a memory, and stores therein sets of: an HRTF that has been output from the control unit 110; and a measurement direction. The input unit 160 is a button switch or the like for example, and is an input apparatus from which the user inputs an instruction to start HRTF measurement. The input unit 160 outputs an HRTF measurement start signal to the control unit 110. The second sound output unit 170 is constituted of earphones that are integrated with the sound collection unit 130 for example, and outputs an audio signal to the user.

2. Configuration of Control Unit

Figure 3:
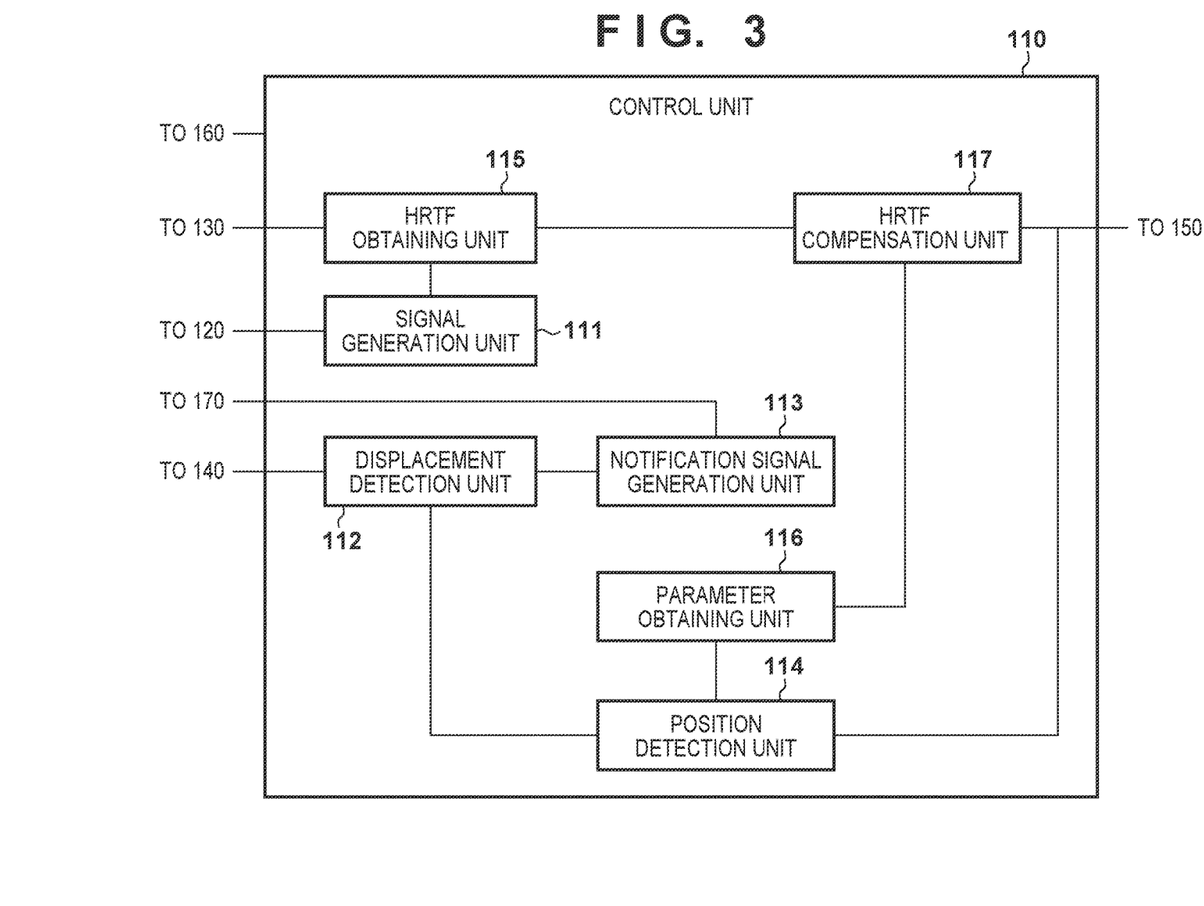
FIG. 3 is a diagram showing details of a control unit according to Embodiment 1 of the present invention.

Next, a description is given of the details of the control unit 110 according to Embodiment 1 of the present invention with reference to FIG. 3. The control unit 110 includes a signal generation unit 111, a displacement detection unit 112, a notification signal generation unit 113, a position detection unit 114, an HRTF obtaining unit 115, a parameter obtaining unit 116, and an HRTF compensation unit 117.

The signal generation unit 111 generates a measurement signal used for HRTF measurement. Here, "measurement signal" means a signal that is output from the sound output unit 120 as a sound in order to measure the HRTF. For example, a time stretched pulse (TSP) signal, a maximum length sequence (MLS) signal, or the like may be used as the measurement signal. The signal thus generated is output to the sound output unit 120.

The displacement detection unit 112 detects a displacement amount that indicates the degree of displacement in the positional relationship between the sound output unit 120 and the user (the displacement of the imaging unit 140) during a period in which the measurement signal is output, based on images captured by the imaging unit 140. For example, in the present embodiment, the displacement detection unit 112 detects the amount of displacement of the user's head based on the differences between the images captured before the measurement signal is output and the images captured after the measurement signal is output. If the displacement amount is greater than a predetermined amount, the displacement detection unit 112 outputs a signal to the notification signal generation unit 113. If the displacement amount is no greater than the predetermined amount, the displacement detection unit 112 outputs images that have been input from the imaging unit 140, to the position detection unit 114.

Upon receiving a signal that has been input from the displacement detection unit 112, the notification signal generation unit 113 generates a signal for notifying the user of a measurement failure, and outputs the signal to the second sound output unit 170. For example, the notification signal generation unit 113 may output a buzzer signal reporting an error. The buzzer signal may be output from the sound output unit 120. However, if the sound collection unit 130 is provided to cover the earholes, there is a problem in which it is difficult for the user to hear the buzzer signal. Therefore, a configuration may be adopted in which the buzzer signal is output from the second sound output unit 170.

The position detection unit 114 detects the position (direction) of the sound output unit 120 relative to the user's head (or ears) at the time of measurement, based on the images captured by the imaging unit 140. The position detection unit 114 outputs the position (direction) thus detected to the storage unit 150 together with an HRTF that has been compensated by the HRTF compensation unit 117 described below. Furthermore, the position detection unit 114 outputs the position thus detected to the parameter obtaining unit 116.

The HRTF obtaining unit 115 obtains an HRTF based on signals input from the signal generation unit 111 and the sound collection unit 130. The method for obtaining an HRTF, such as an MLS method or a TSP method, may be selected depending on the output from the signal generation unit 111. For example, when the signal generated by the signal generation unit 111 is x, the signal collected as a sound by the sound collection unit 130 is y, and x and y after being subjected to Fourier transform are X and Y respectively, the HRTF obtaining unit 115 calculates the HRTF according to "HRTF=Y/X". The HRTF thus calculated is output to the HRTF compensation unit 117.

The parameter obtaining unit 116 obtains the distance between the user's head and the sound output unit 120 as a parameter, based on the position of the sound output unit 120 relative to the user's head, input from the position detection unit 114. For example, the parameter obtaining unit 116 calculates the distance to the user based on stereo images captured by the two cameras that constitute the imaging unit 140. The distance thus calculated between the sound output unit 120 and the user's head is output to the HRTF compensation unit 117 as a parameter.

The HRTF compensation unit 117 compensates the HRTF that has been input from the HRTF obtaining unit 115 based on the parameter that has been input from the parameter obtaining unit 116. In the present embodiment, the sound output unit 120 is held by the user as shown in FIG. 2A, and the distance between the sound output unit 120 and the user's head varies for each measurement. In other words, the HRTF thus measured varies in the distance depending on the direction. When such an HRTF is used, there is the possibility of the sound volume and the phase varying depending on the direction, and degrading the presence. In light of this possibility, the HRTF compensation unit 117 performs HRTF distance compensation. The HRTF compensation unit 117 compensates the sound volume (amplitude), or the time delay (phase), or both (the amplitude and the phase), based on the distance between the sound output unit 120 and the user that has been input from the parameter obtaining unit 116, using an inverse-square law. The HRTF thus compensated is output to the storage unit 150.

3. Measurement Processing

Figure 4:
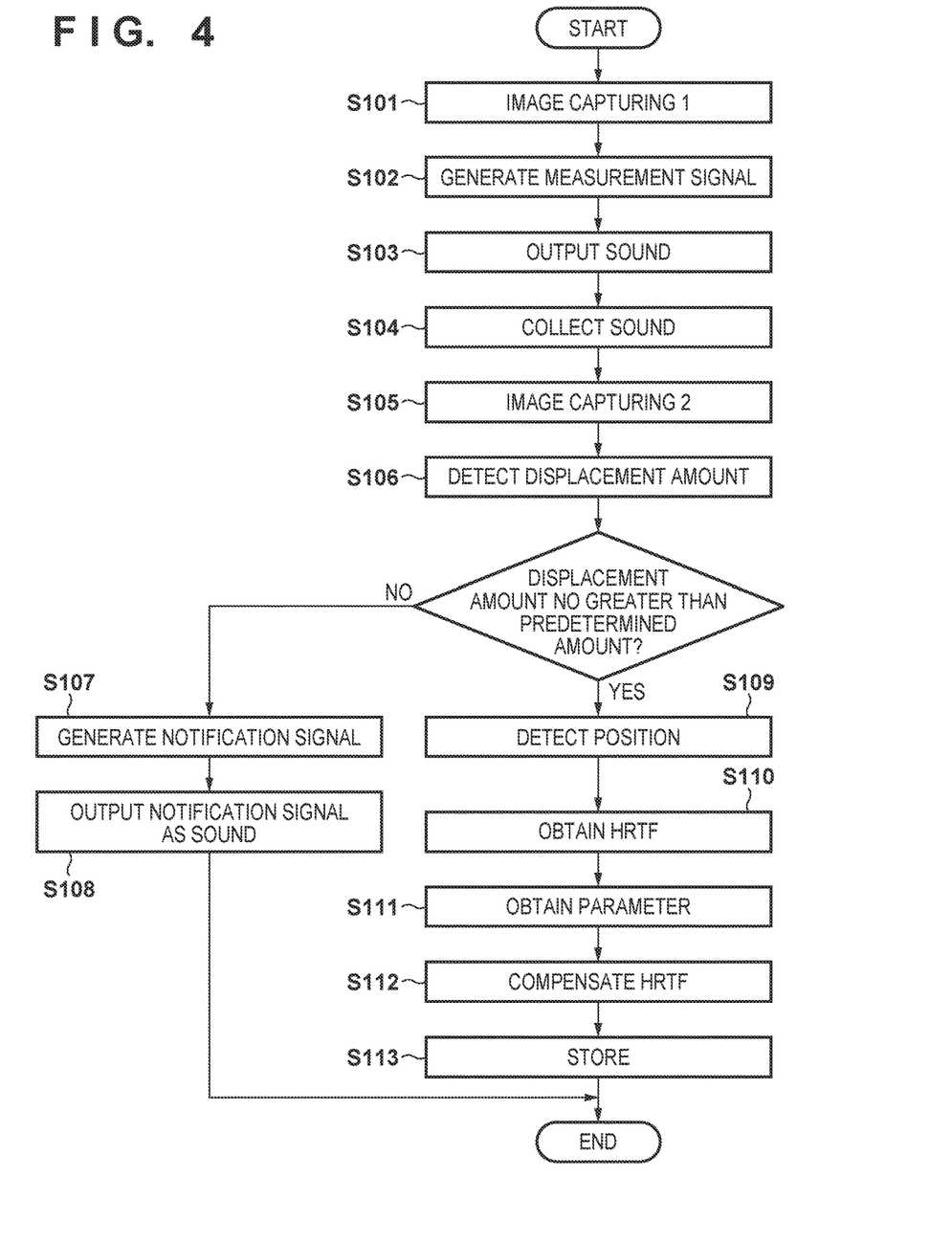
FIG. 4 is a flowchart showing procedures for measuring a head-related transfer function according to an embodiment of the present invention.

Next, a description is given of the processing procedures for head-related transfer function measurement according to the present embodiment with reference to the flowchart shown in FIG. 4. Upon a measurement start signal being input from the input unit 160 based on a user operation, head-related transfer function measurement processing is started.

Upon measurement being started, the imaging unit 140 performs the first image capturing (step S101). The images thus captured are output to the displacement detection unit 112. Subsequently, the signal generation unit 111 generates a measurement signal (step S102). The measurement signal thus generated is output to the sound output unit 120. Then, the sound output unit 120 reproduces the measurement signal (step S103). Subsequently, the sound collection unit 130 collects the measurement signal that has been output from the sound output unit 120 as a sound (step S104). The signal thus collected as a sound is output to the HRTF obtaining unit 115.

Subsequently, the imaging unit 140 performs the second image capturing (step S105). The images thus captured are output to the displacement detection unit 112 in the same manner as in step S101. Subsequently, the displacement detection unit 112 detects the displacement amount from the differences between the images captured by the first image capturing and the images captured by the second image capturing, which have been input from the imaging unit 140 (step S106). If the displacement amount thus detected is greater than the predetermined amount, the displacement detection unit 112 outputs a signal to the notification signal generation unit 113. On the other hand, if the displacement amount is no greater than the predetermined amount, the displacement detection unit 112 outputs the images that have been input, to the position detection unit 114.

If the displacement amount detected in step S106 is greater than the predetermined amount, the notification signal generation unit 113 generates a notification signal (step S107). The notification signal thus generated is output from the notification signal generation unit 113 to the second sound output unit 170. Subsequently, the second sound output unit 170 outputs the notification signal as a sound (step S108). Thereafter, the series of processing ends.

On the other hand, if the displacement amount detected in step S106 is no greater than the predetermined amount, the position detection unit 114 detects the position of the sound output unit 120 relative to the user's head (or ears) at the time of measurement, based on the images captured by the imaging unit 140 (step S109). The detected position is output to the parameter obtaining unit 116 and the storage unit 150.

Subsequently, the HRTF obtaining unit 115 obtains an HRTF based on the signals input from the signal generation unit 111 and the sound collection unit 130 (step S110). The HRTF thus obtained is output to the HRTF compensation unit 117. Subsequently, the parameter obtaining unit 116 obtains the distance between the user's head and the sound output unit 120 as a parameter (step S111). The distance between the user's head and the sound output unit 120 thus obtained is output to the HRTF compensation unit 117.

Subsequently, the HRTF compensation unit 117 compensates the HRTF that has been input from the HRTF obtaining unit 115 based on the parameter that has been input from the parameter obtaining unit 116 (step S112). The HRTF thus compensated is output to the storage unit 150. Finally, the storage unit 150 stores the direction of the sound output unit 120 relative to the user's head, which has been input from the position detection unit 114, and the HRTF, which has been compensated by the HRTF compensation unit 117, in association with each other (step S113). Thereafter, the series of processing ends.

The user can obtain HRTF datasets for all directions by performing the measurement processing a required number of times.

As described above, it is possible to easily measure the head-related transfer function for each individual user by performing measurement while detecting the positional relationship between the speaker and the user's head.

In the configuration according to the present embodiment, the sound collection unit 130 is attached near the user's earholes, and the sound output unit 120 is moved around the user's head. However, the positions of the sound collection unit 130 and the sound output unit 120 may be interchanged. For example, a reciprocal method may be used, and the sound output unit 120 may be attached near the user's earholes, and the sound collection unit 130 may be moved around the user's head.

In the present embodiment, a description has been given of an example in which the imaging unit 140 is constituted of two cameras for measuring the distance between the user and the sound output unit 120. However, it is acceptable that only one camera is used. If this is the case, the distance between the user and the sound output unit 120 may be measured by a motion stereo method for example. Alternatively, the imaging unit 140 may be provided with an infrared irradiation apparatus or the like, and the distance may be estimated by using an active method.

Also, in the present embodiment, as shown in FIG. 2A, a description has been given of an example in which the sound output unit 120 and the imaging unit 140 are held by the user via the supporting member 200 that is rod-shaped. However, the manner of holding does not limit the present invention. For example, as shown in FIG. 2B, it is acceptable that the user holds, for example, a portable apparatus such as a smartphone that is provided with the functions of the control unit 110, the sound output unit 120, the imaging unit 140 and the storage unit 150. In this case, a configuration may be adopted in which the audio signal collected by the sound collection unit 130 as a sound may be transmitted to the portable apparatus via wireless.

In the present embodiment, a description has been given of an example in which it is the user himself/herself who moves or holds the sound output unit 120. However, the measurement-subject person, for whom the head-related transfer function is measured, and the user who moves or holds the sound output unit 120 may be different. The imaging unit 140 may also be held by a user that is different from the measurement-subject person.

In the present embodiment, a description has been given of an example in which the sound collection unit 130 is constituted of two microphones, which are attached to the two ears. However, the sound collection unit 130 may be configured with one microphone and measurement may be separately performed for each ear. In the present embodiment, a description has been given of an example in which the control unit 110 starts measurement in response to an input from the input unit 160. However, measurement may be automatically started. For example, measurement may be automatically started upon the user holding and stopping the sound output unit 120 orientated in approximately an unmeasured direction during a period of time that is greater than or equal to a predetermined period of time.

Also, although the measurement signal is generated by the signal generation unit 111 in the present embodiment, a configuration may be adopted in which the measurement signal is stored in a memory or the like in advance and is read at the time of measurement. In the present embodiment, the displacement detection unit 112 detects the displacement of the user's head from the images captured by the imaging unit 140. However, the imaging unit 140 may be provided with an orientation sensor or an acceleration sensor, and the displacement of the imaging unit 140 may be detected during image capturing.

In the present embodiment, it is the displacement detection unit 112 that has the function of detecting an error during measurement. However, in addition to the displacement of the imaging unit 140, there are other potential factors that have an influence on measurement. For example, measurement can be influenced by the motion (movement) of the measurement-subject person, a significant displacement of the position of the measurement-subject person from a position in front of the speaker, a significant change in the facial expression of the measurement-subject person, and so on. Therefore, a configuration for detecting these factors may be adopted. Furthermore, measurement is also influenced by the entrance of a foreign object that reflects external sound, an approaching sound source that is irrelevant to the measurement, and so on. Therefore, the function of detecting these factors may be provided. A configuration may be adopted in which a signal is output to the notification signal generation unit 113 upon an error being detected due to the factors that have an influence on the measurement. If this is the case, the notification signal generation unit 113 may generate a different notification sound according to the type of the detected error.

In the present embodiment, the measurement error is notified by using an audio signal. However, a display apparatus for displaying an error status may be provided, and an error notification may be performed by displaying the error status on the display apparatus. If this is the case, the notification signal generation unit 113 may generate a signal that is to be displayed on the display apparatus.

In the present embodiment, the position detection unit 114 detects the position of the sound output unit 120 relative to the user's head, based on the images captured by the imaging unit 140. However, it can be difficult to detect the orientation of the head based on images of, for example, the back of the head that has a small number of feature points. For this reason, a marker or the like may be provided on the back of the head in advance. Also, a configuration may be adopted in which another kind of information is used. For example, the imaging unit 140 may be provided with an orientation sensor or an acceleration sensor, and information from such a sensor may be used as well.

In the present embodiment, the HRTF compensation unit 117 compensates the sound volume of the HRTF by using an inverse-square law, based on the distance between the sound output unit 120 and the user obtained by the parameter obtaining unit 116. However, another method may be used. For example, since the anticipated angles of the sound output unit 120 relative to the right and left ears vary depending on the distance between the sound output unit 120 and the user, the directions in which the right and left HRTFs are associated may be changed according to the distance.

Also, the HRTF compensation unit 117 may perform HRTF compensation other than compensation based on the distance. In other words, the HRTF compensation unit 117 may have the function of compensating the characteristics of the speaker and the microphone that have been used. For example, the HRTF compensation unit 117 may compensate the HRTF by using the measurement result in the case where the speaker and the microphone that are to be used are provided at an appropriate interval. Here, "appropriate interval" may be a distance that is equal to the sum of the length of the supporting member 200 that holds the sound output unit 120 and the length of the user's arm.

In the present embodiment, a small speaker is used as the sound output unit 120 for the sake of user convenience. However, since there is a problem in which small speakers are not suited to output low sound, there is the possibility of a low-range part of the obtained HRTF indicating an incorrect result. Considering this problem, it is acceptable to compensate the frequency response of the HRTF. For example, since low-range sound does not have a significant influence on sound localization, compensation may be performed such that the low-range part of the input signal is output without change.

Figure 5:
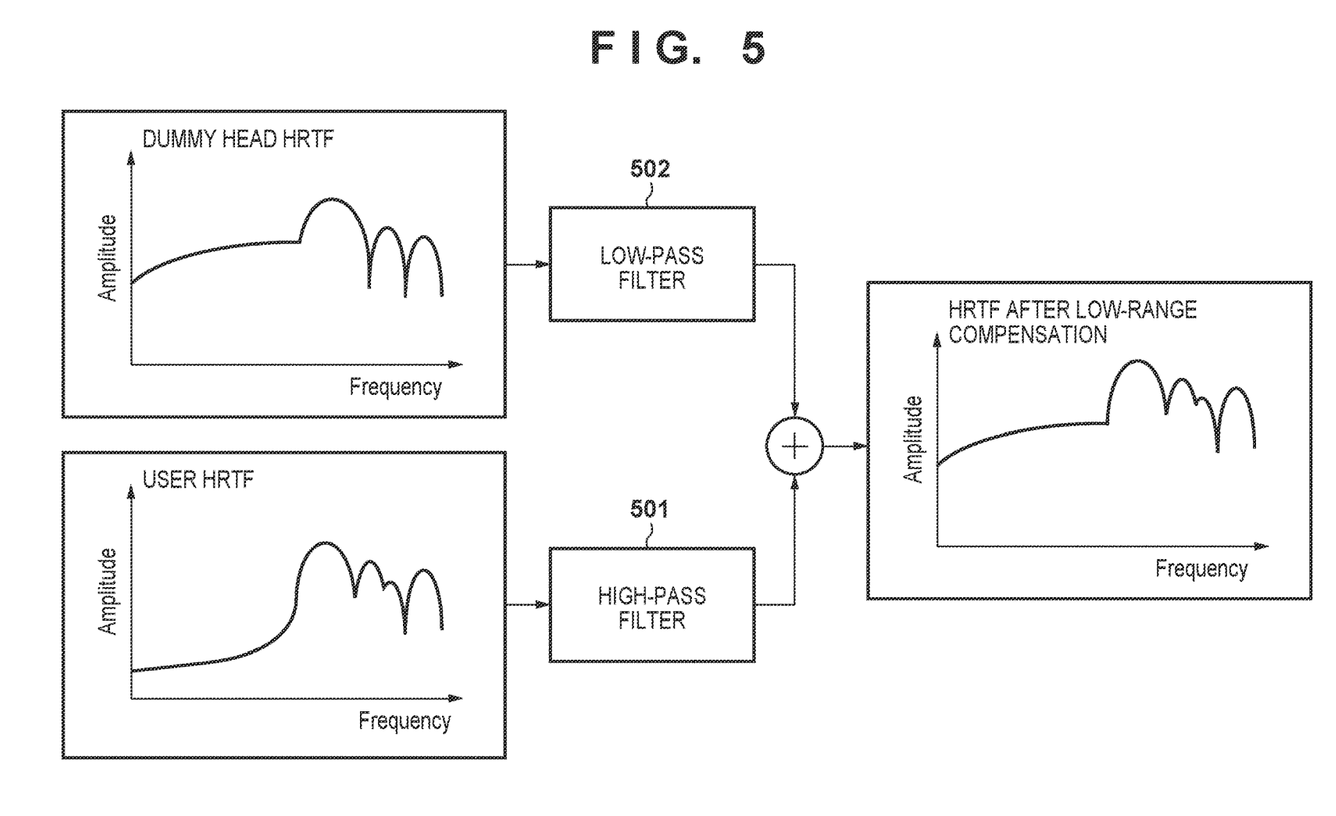
FIG. 5 is a diagram illustrating low-range compensation of a head-related transfer function according to an embodiment of the present invention.

Also, for example, since it is unlikely that the low-range part of the HRTF changes depending on the shape of the head, a predetermined low-range part may be replaced with an HRTF obtained using a typical dummy head. For example, as shown in FIG. 5, low-range compensation may be performed by summing the result of application of a high-pass filter 501 to the user's HRTF measured according to the present embodiment, and the result of application of a low-pass filter 502 to the HRTF obtained by using a dummy head orientated in the direction that is the same as or approximately the same as the measured HRTF. If this is the case, the phase difference (delay difference) between the HRTF measured using the dummy head and the user's HRTF is taken into consideration.

Alternatively, a configuration may be adopted in which user's head and auricle shape models are obtained by estimation from the user's facial images that have been captured, acoustic simulation is performed using the shape models, and the low-range part of the HRTF is replaced. In acoustic simulation, a finite-difference time-domain method or the like may be used, for example. Or, more simply, the distance between the user's ears may be extracted from the facial images, and the low-range part of the HRTF may be used with consideration to only the inter-ear time difference. Alternatively, the most suitable HRTF may be selected from a database based on the shapes of the user's auricles. For example, the most suitable HRTF may be selected from a database of HRTFs that are measured within a sufficiently low range using captured images of the auricles, and the measured HRTF may be compensated using the low-range part of the HRTF thus selected.

Although a description has been given of an example in which the storage unit 150 stores HRTFs and the directions of the sound output unit 120 relative to the user's head, the captured facial images or parameters for face authentication may also be stored therein. Automatic HRTF switching may be performed according to face authentication at the time of using an HRTF.

In the present embodiment, the user performs measurement in all directions. However, measurement may be performed in only a particular direction, and existing HRTFs may be used for other directions. For example, it is acceptable that a sound localization test is performed in advance using existing HRTFs, and measurement processing according to the present embodiment is performed with respect to only directions that cause a significant displacement of the sound image or that cause inside-the-head localization, and existing HRTFs are used without change with respect to other directions.

Embodiment 2

In Embodiment 1, a description has been given of an example in which the sound output unit 120 is moved around the user. In contrast, in the present embodiment, a description is given of an example in which the sound output unit 120 is fixed and the user moves his/her head.

Figure 6:
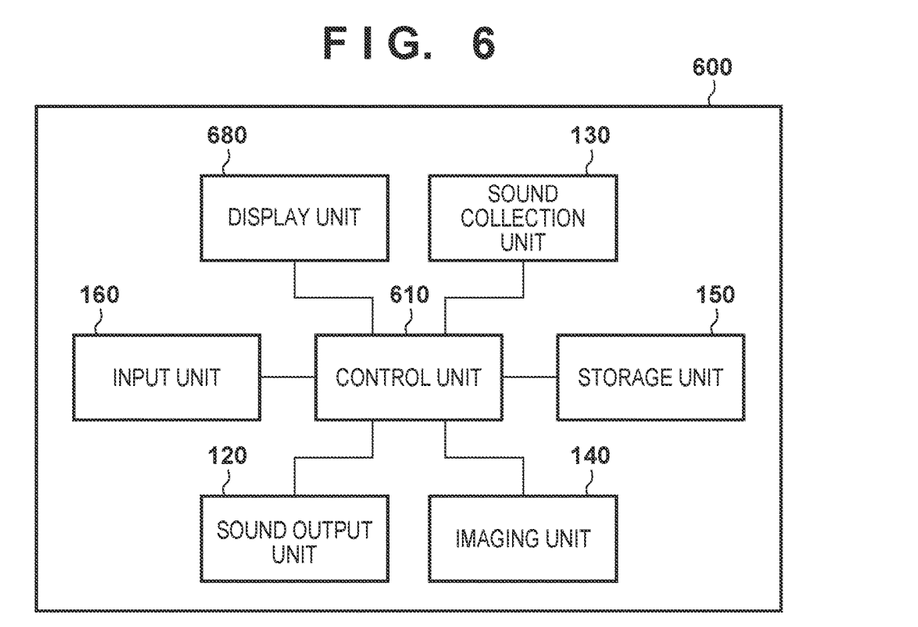
FIG. 6 is a block diagram showing an example of a configuration of a measurement system according to Embodiment 2 of the present invention.
Figure 7:
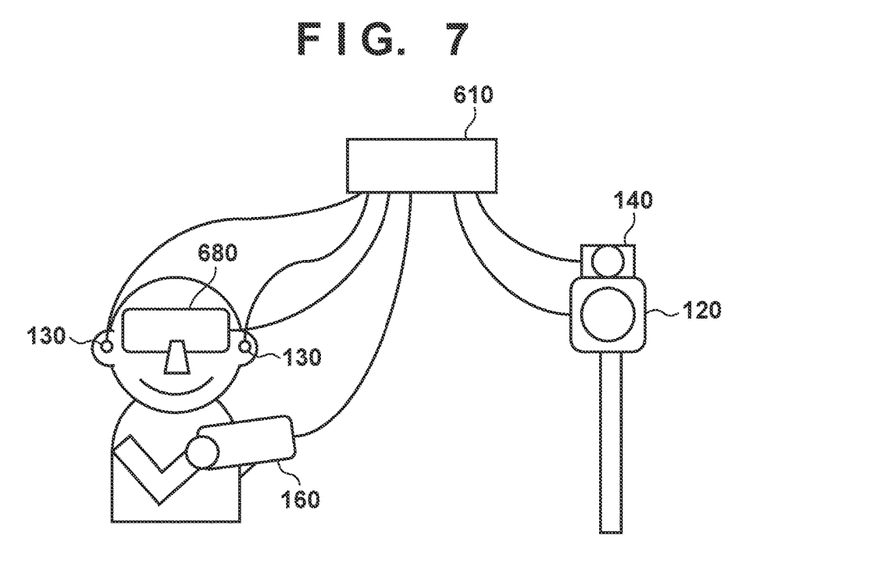
FIG. 7 is a diagram showing an example of head-related transfer function measurement according to Embodiment 2 of the present invention.

FIG. 6 is a block diagram showing an example of a configuration of a head related transfer function measurement system 600 according to Embodiment 2 of the present invention. FIG. 7 shows a usage example of the measurement system 600 according to Embodiment 2 of the present invention.

The head-related transfer function measurement system 600 includes a control unit 610, a sound output unit 120, a sound collection unit 130, an imaging unit 140, a storage unit 150, an input unit 160, and a display unit 680. The details of the functions of the control unit 610 are described later with reference to FIG. 8. The functions of the sound output unit 120, the sound collection unit 130, the imaging unit 140, the storage unit 150, and the input unit 160 are almost the same as the functions of those in Embodiment 1, and a description thereof is omitted. The display unit 680 is configured with a head mount display (HMD) or the like, for example, and obtains and displays an image captured by the imaging unit 140.

Figure 8:
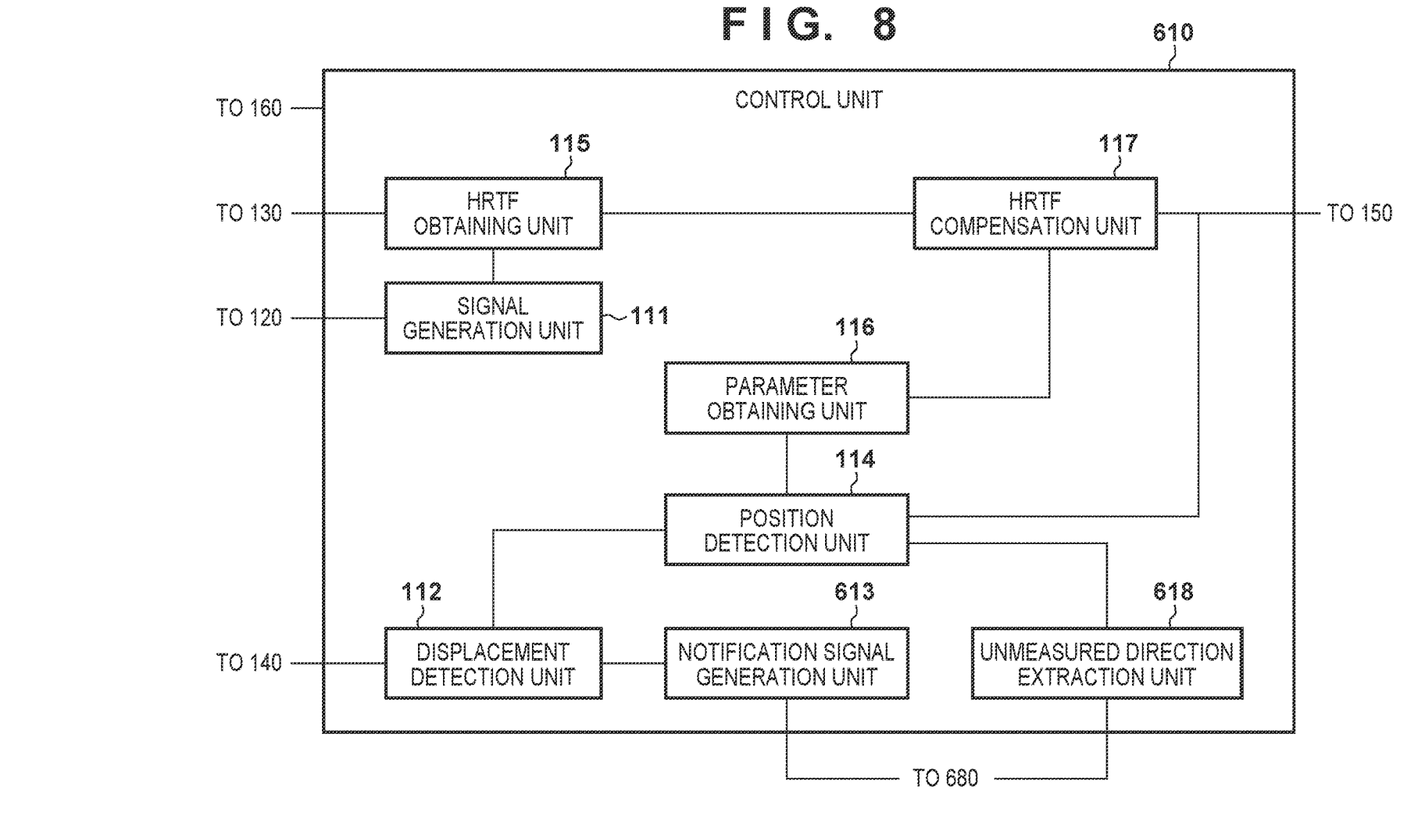
FIG. 8 is a diagram showing details of a control unit according to Embodiment 2 of the present invention.

Next, a description is given of the details of the control unit 610 according to Embodiment 2 of the present invention with reference to FIG. 8. The control unit 610 includes a signal generation unit 111, a displacement detection unit 112, a notification signal generation unit 613, a position detection unit 114, an HRTF obtaining unit 115, a parameter obtaining unit 116, an HRTF compensation unit 117, and an unmeasured direction extraction unit 618.

The functions of the signal generation unit 111, the displacement detection unit 112, the position detection unit 114, the HRTF obtaining unit 115, the parameter obtaining unit 116 and the HRTF compensation unit 117 are the same as the functions of those in Embodiment 1, and a description thereof is omitted.

Upon receiving a signal that has been input from the displacement detection unit 112, the notification signal generation unit 613 generates a signal for notifying the user of a measurement failure, and outputs the signal to the display unit 680. For example, a message reporting an error is displayed on the display unit 680. The unmeasured direction extraction unit 618 stores therein the directions for which measurement has been performed, and extracts an unmeasured direction for which measurement has not been performed. The unmeasured direction thus extracted is output to the display unit 680, and the display unit 680 performs display control by which, for example, the unmeasured direction is superposed on an image captured by the imaging unit 140.

As described above, according to the present embodiment, the positions of the sound output unit 120 and the imaging unit 140 are fixed, and the user rotates his/her head. Therefore, it is possible to use a large speaker, and it is possible to measure a broadband head-related transfer function with low distortion.

In the present embodiment, it is assumed that there is one sound output unit 120 and one imaging unit 140 for example. However, there may be a plurality of sound output units 120 and a plurality of imaging units 140. In the present embodiment, the unmeasured direction is displayed to the user by the display unit 680 on which the unmeasured direction is superposed on an image captured by the imaging unit 140. In addition, an instruction that informs the user of the direction in which his/her head should be moved may be displayed on the display unit 680.

One aspect of the present invention makes it possible to easily measure the head-related transfer function.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-135509, filed Jul. 6, 2015, which is hereby incorporated by reference wherein in its entirety.

What is claimed is:

1. A control apparatus comprising:
a hardware processor; and
a memory which stores instructions to be executed by the hardware processor, wherein, in accordance with the instructions executed by the hardware processor, the control apparatus functions as:
obtaining a result of sound collection, performed by a sound collection apparatus for collecting a sound at a position near an ear of a user, for collecting a sound outputted from a sound output apparatus;
detecting a distance between the sound output apparatus and a head of the user;
detecting a direction of the sound output apparatus from the head of the user;
determining a head-related transfer function as a parameter related to a propagation characteristic of a sound affected by the head of the user, based on the sound outputted from the sound output apparatus and the result of the sound collection at the position near the ear of the user obtained in the obtaining;
compensating, based on the detected distance between the sound output apparatus and the head of the user at a time of the sound collection, the parameter related to the propagation characteristic of the sound affected by the head of the user determined based on the result of the sound collection in the determining; and
outputting the compensated parameter associated with the detected direction of the sound output apparatus from the head of the user at the time of the sound collection to a storage unit configured to store the compensated parameter as a parameter to be applied to an audio signal for generating a reproduction audio signal.

2. The control apparatus according to claim 1, wherein in the compensating, the parameter is compensated in terms of at least either an amplitude or a phase thereof according to the detected distance between the head of the user and the sound output apparatus.

3. The control apparatus according to claim 1, wherein in the compensating, the head-related transfer function determined as the parameter in the determining is compensated in terms of frequency response.

4. The control apparatus according to claim 1, wherein a head-related transfer function determined as the parameter in the determining is compensated in terms of frequency response for a predetermined low-range of frequency.

5. The control apparatus according to claim 1, wherein the direction of the sound output apparatus from the head of the user and the distance between the sound output apparatus and the head of the user are detected based on a captured image obtained by capturing the head of the user by a camera.

6. The control apparatus according to claim 1, wherein the control apparatus further functions as:
    detecting movement of at least one of the sound output apparatus and the head of the user, wherein in the determining, the parameter is determined in a case where an amount of the detected movement is no greater than a predetermined amount.

7. The control apparatus according to claim 1, wherein the control apparatus further functions as:
    detecting movement of at least one of the sound output apparatus and the head of the user; and
    performing error notification in a case where an amount of the detected movement is greater than a predetermined amount.

8. The control apparatus according to claim 1, wherein in the determining, a head-related transfer function for the user is determined as the parameter.

9. The control apparatus according to claim 8, wherein the control apparatus further functions as correcting, based on a predetermined head related transfer function, a predetermined frequency part of the head related transfer function determined in the determining.

10. The control apparatus according to claim 1, wherein in the compensating, the parameter is compensated so that the compensated parameter obtained by the compensating corresponds to a predetermined distance.

11. The control apparatus according to claim 10, wherein in the storing, a plurality of compensated parameters associated with a plurality of detected directions are stored in the storage unit, and wherein the plurality of compensated parameters associated with the plurality of detected directions corresponds to the same predetermined distance.

12. The control apparatus according to claim 11, wherein the control apparatus further functions as:
    outputting a signal to a display apparatus for causing the display apparatus to display information indicating a specific direction in a case where a compensated parameter related to a propagation characteristic of a sound associated with the specific direction has not been stored in the storage unit.

13. The control apparatus according to claim 11, wherein the control apparatus further functions as:
    notifying a user of information for distinguishing the plurality of detected directions from another direction.

14. The control apparatus according to claim 1, wherein the detected distance between the sound output apparatus and the head of the user corresponds to the distance between the sound output apparatus and the ear of the user, and
    wherein the detected direction of the sound output apparatus from the head of the user corresponds to the direction of the sound output apparatus and the ear of the user.

15. A control apparatus comprising:
    a hardware processor; and
    a memory which stores instructions to be executed by the hardware processor, wherein, in accordance with the instructions executed by the hardware processor, the control apparatus functions as:
    obtaining a result of sound collection performed by a sound collection apparatus, for collecting a sound outputted from a sound output apparatus which is set at a position near an ear of a user;
    detecting a distance between the sound output apparatus and a head of the user;
    detecting a direction of the sound collection apparatus from the head of the user;
    determining a head-related transfer function as a parameter related to a propagation characteristic of a sound affected by the head of the user, based on the sound outputted from the sound output apparatus at the position near the ear of the user and the result of the sound collection obtained in the obtaining;
    compensating, based on the detected distance between the sound output apparatus and the head of the user at a time of the sound collection, the parameter related to the propagation characteristic of the sound affected by the head of the user determined based on the result of the sound collection in the determining, so that a compensated parameter obtained by the compensating corresponds to a predetermined distance; and
    outputting the compensated parameter associated with the detected direction of the sound collection apparatus from the head of the user at the time of the sound collection to a storage unit configured to store the compensated parameter as a parameter to be applied to an audio signal for generating a reproduction audio signal.

16. A control method for a control apparatus, comprising:
    obtaining a result of sound collection, performed by a sound collection apparatus for collecting a sound at a position near an ear of a user, for collecting a sound outputted from a sound output apparatus;
    detecting a distance between the sound output apparatus and a head of the user;
    detecting a direction of the sound output apparatus from the head of the user;
    determining a head-related transfer function as a parameter related to a propagation characteristic of a sound affected by the head of the user, based on the sound outputted from the sound output apparatus and the result of the sound collection at the position near the ear of the user obtained in the obtaining;
    compensating, based on the detected distance between the sound output apparatus and the head of the user at a time of the sound collection, the parameter related to the propagation characteristic of the sound affected by the head of the user determined based on the result of the sound collection in the determining; and
    outputting the compensated parameter associated with the detected direction of the sound output apparatus from the head of the user at the time of the sound collection to a storage unit configured to store the compensated parameter as a parameter to be applied to an audio signal for generating a reproduction audio signal.

17. A non-transitory computer-readable storage medium storing a computer program for causing a computer to perform a control method comprising:
    obtaining a result of sound collection performed by a sound collection apparatus for collecting a sound at a position near an ear of a user, for collecting a sound outputted from a sound output apparatus;
    detecting a distance between the sound output apparatus and a head of the user;
    detecting a direction of the sound output apparatus from the head of the user;
    determining a head-related transfer function as a parameter related to a propagation characteristic of a sound affected by the head of the user, based on the sound outputted from the sound output apparatus and the result of the sound collection at the position near the ear of the user obtained in the obtaining;

compensating, based on the detected distance between the sound output apparatus and the head of the user at a time of the sound collection, the parameter related to the propagation characteristic of the sound affected by the head of the user determined based on the result of the sound collection in the determining; and outputting the compensated parameter associated with the detected direction of the sound output apparatus from the head of the user at the time of the sound collection to a storage unit configured to store the compensated parameter as a parameter to be applied to an audio signal for generating a reproduction audio signal.

\* \* \* \* \*